May 10, 1955 R. B. HORSFALL, JR 2,707,898
VERTICALLY ORIENTED OPTICAL SYSTEM
Filed Aug. 4, 1952
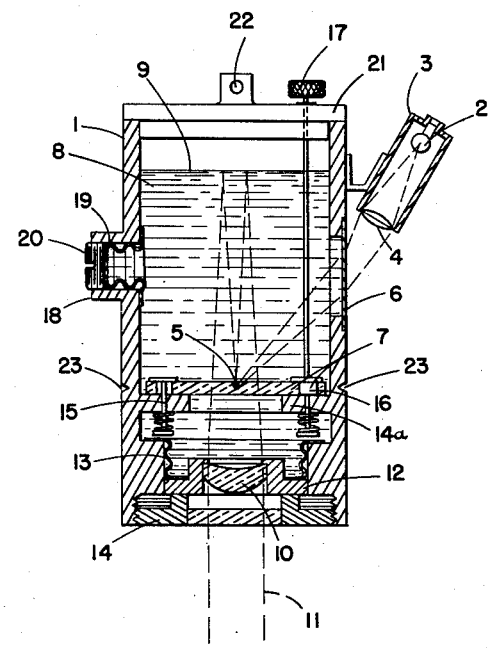
INVENTOR.
ROBERT B. HORSFALL JR.
BY *William L. Lane*
ATTORNEY

United States Patent Office 2,707,898
Patented May 10, 1955

2,707,898
VERTICALLY ORIENTED OPTICAL SYSTEM

Robert B. Horsfall, Jr., Whittier, Calif., assignor to North American Aviation, Inc.

Application August 4, 1952, Serial No. 302,604

8 Claims. (Cl. 88—1)

This invention relates to optical devices, and more specifically to a device for generating an optical substitute for a star directly over the head of the observer.

In the alignment and checking of instruments designed for celestial observation and navigation it is necessary to employ some type of device which yields a vertically oriented beam of light. Since the line of sight to a zenith star would be so oriented, it is appropriate to refer to such a device as a zenith star source.

It is an object of this invention to provide a zenith star source.

It is another object of this invention to provide an optical device which produces a vertically oriented collimated beam of light from a point source.

It is another object of this invention to provide a zenith star source in which reflection from a gravity-oriented, interfacial fluid surface guarantees nadir projection of the light beam from the instrument.

It is another object of this invention to provide a zenith star source in which the disposition of components is such that anomalous optical functioning generally attendant to the off-axis operation of a device of this character is nullified.

It is another object of this invention to provide a zenith star source in which the character of the component materials and the design geometry of the instrument is such as to compensate against anomalous behavior due to temperature changes.

It is another object of this invention to provide a zenith star source in which the optical design of components is such as to insure a well collimated point source of good optical image quality at all times.

It is another object of this invention to provide a compact, folded assemblage which is suitably housed for expeditious use both in the laboratory and in the field.

Other objects of invention will become apparent from the following description taken in connection with the accompanying single figure which is a sectional view of the invention in which the gravity axis is coincident with the vertical axis of the device.

In the specific embodiment of the invention illustrated in the drawing, the device comprises a cylindrical chamber 1 in which are contained or to which are attached the functional elements. A light source 2, contained in a housing 3 attached to chamber 1, is imaged by lens 4 on ball 5. A window 6 in the side of cylindrical chamber 1 allows entry of the light rays which, after passage through transparent fluid 8, form this image. Ball 5, presenting a spherical surface that is highly reflective, is embedded in plate 7 of transparent material of substantially the same optical properties as the chosen fluid. A small virtual image of the original source is thus formed within ball 5. Rays of light from this small image then emerge from plate 7 and enter transparent fluid 8. Upon reaching fluid-air interface 9, a portion of the rays are reflected back through the fluid and plate 7 to lens 10, and emerge as collimated beam 11.

Lens 10 is mounted in a supporting plate 12, free for vertical movement within cylindrical chamber 1. A fluid-tight but flexible seal is provided between supporting plate 12 and chamber 1 by Sylphon bellows 13. In addition, Sylphon bellows 13 is designed to provide a compressive force downward that insures that supporting plate 12 will bear positively on bezel ring 14 by which supporting plate 12, and consequently lens 10, can be translated upward and downward.

Plate 7 containing ball 5 is supported on shelf 14a machined into cylindrical chamber 1. By means of two vertical restraining fixtures—one of which is shown at 15, while the other is in quadrature thereto—and two eccentric rotor-translating cams with vertical restraining features, one of which is shown at 16, while the other is in quadrature thereto, plate 7 may be translated. This is accomplished by means of shaft extensions from the two cams. One of these is shown at 17.

A protrusion 18 in cylindrical chamber 1 accommodates Sylphon bellows 19 which is closed at one end and suitably sealed so as to be fluid-tight at the other end. Like previously mentioned Sylphon bellows 13, bellows 19 is designed to provide a compressive force outward. The bellows' closed end thereby bears on the flat screw 20 by which it can be moved inward or outward with a consequent raising or lowering of the fluid interface 9.

A closure lid 21, to which is formed a supporting eye 22, completes the assembly. Any suitable frame or boom support may be bolted to eye 22 to provide proper spatial orientation of the device.

Two indents 23 are machined in opposite sides of the cylindrical chamber 1. The purpose of these indents will become apparent as the technique for adjustment of the device is considered.

Two features of the device contribute particularly to its insensitiveness to vertical misorientation. These are the ability of interfacial surface 9 always to seek a horizontal orientation, and the location of ball image 5 at the second nodal point of exit lens system 10. The first feature is based on the fact that for small angles of skewness of the vertical axis of the device with respect to the gravitational vector, the distance between either ball 5 or the exit lens 10 and interfacial surface 9 does not change significantly. The system under these conditions is equivalent to a vertical erected system with exit lens 10 slightly tipped. With a suitably corrected lens 10, this oblique ray operation does not produce any appreciable deterioration in the optical quality of the star image. The second consideration is concerned with the well known optical principle that the image formed by a lens from a collimated beam suffers no translation as the lens is rotated about its nodal point nearest the image. Here, in semblance, the reciprocal effect is invoked, for any rotation of the device about any horizontal axis can be resolved into a similar rotation about the second nodal point and a vertical and horizontal translation. Therefore, since the object (ball image) is located at the second nodal point, which remains fixed with respect to the exit lens, no directional shift of the collimated exit rays 11 occurs as the axis of the device is skewed from the vertical. The ball, of course, may be regarded for analytical purposes as a point source of light, with any other practical means being employed to bring the light to that location.

The adjustments preliminary to using the device consist of, first, collimating the system by adjustment of fluid level 9 by adding or subtracting fluid 8 for a rough adjustment; and, finally, manipulating sylphon bellows 19 with nut 20. This operation and subsequent ones are, of course, monitored with a suitable vertical telescope above which the device is located. Thereafter the device is supported, still over the telescope, in a gimbal (not shown) which engages side indents 23. While the device is slowly rocked to and fro, lower bezel ring 14 is manipulated to raise and lower the lower lens 10 and thus vary the distance between the ball 5 and this lens As described above, when an adjustment is achieved for which there is no motion of the star image in the telescope, the ball image is assumed coincident with the second nodal point of lower lens 10. During this manipulation, there would normally be a change in the optical path distance between lower lens 10 and ball image 5 which would cause defocusing of the image. However, the relative diameters of lower lens holder 12 and Sylphon bellows 13 are such that this effect is compensated. The raising of lower lens 10 two units raises the interfacial surface 9 one unit, with the result that the optical path distance between the ball image at 5 and the lower lens 10 remains constant.

There are certain requirements regarding the selection of fluid 8 and plate 7. Obviously, they must be transparent, colorless, and chemically stable. In addition, the fluid must be chemically and physically inert with respect to both plate 7 and contact elements within chamber 1. The fluid should also be sufficiently viscous to damp out vibrations. The optical properties, such as index of refraction and dispersion of plate 7 and fluid 8, must be nearly identical in order that the system be optically homogeneous. A plastic material such as transparent lucite or methyl methacrylate has been found satisfactory as a material for plate 7, while mineral oil has been found to be a satisfactory fluid.

To insure the device against anomalous functioning due to thermal currents within fluid 8, the walls of chamber 1 are made thick and of a material of high thermal conductivity. This provides for the rapid establishment of thermal equilibrium.

While mineral oil has a positive temperature coefficient of volume expansion, it has a negative temperature coefficient of refractive index. These effects are of such relative magnitude as to tend to be mutually compensatory, leaving only a small residual effect due to temperature variation. If operation is contemplated at temperatures varying appreciably from the design ambient, suitable compensating means such as a calibrated adjustment for bellows 19 can be easily incorporated also to compensate for the effect of change in temperature.

There has thus been provided a zenith star source that, from the optical standpoint, automatically erects itself according to the dictates of the local gravitational vector. The device is substantially independent of temperature variation, and suffers no error due to operation under conditions which require that the longitudinal axis of the device be displaced somewhat angularly from the vertical.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for producing a vertically oriented collimated beam of light from a point source comprising a closed chamber, a lens system situated in the bottom wall of said chamber and having its second nodal point within said chamber, a point source of light at said nodal point, and a transparent fluid having a partially reflective interface with the air above it, said fluid filling said chamber to a point substantially above said point source of light, the sum of the distances between said lens and the surface of said fluid and between said nodal point and the surface of said fluid being adjusted to equal the focal length of said lens system.

2. Means for producing a gravitationally oriented vertical collimated beam of light comprising a closed chamber, a lens system situated in the bottom wall of said chamber and having its second nodal point within said chamber, a point source of light at said nodal point, and a transparent fluid filling said chamber to a level above said nodal point, the surface of said fluid being at least partially reflective, the distance between said nodal point and the surface of said fluid being adjusted to equal half the focal length of said lens system.

3. A device as recited in claim 2 and further comprising means for varying the distance between said point source of light and the interface of said fluid, and means connected to said lens system for varying the distance between said point source of light and said lens system to thereby maintain the proper optical path lengths in the system during adjustment thereof.

4. A device as recited in claim 2 in which said means for producing a point source of light comprises a source of light and a spherical specularly polished ball in which said source of light is imaged.

5. A device as recited in claim 2 in which said point source of light is incorporated in a slab of transparent material having substantially identical optical properties as said transparent fluid and comprising means whereby said transparent slab may be translated to effect alignment of said point source with respect to the optical axis of said lens system.

6. Means for producing a gravitationally oriented vertical collimated beam of light comprising a closed chamber, a bellows structure forming the bottom wall of said chamber, a lens system situated in said structure and having its nodal point within said chamber, a point source of light at said nodal point, and a transparent fluid filling said chamber to a level above said nodal point and forming a reflective surface, said bellows structure being of such size with respect to the cross-sectional area of said chamber in the vicinity of the interface of said fluid that vertical translation of said bellows and lens system causes a proportionate change in the vertical position of said fluid to thereby maintain the optical path lengths therein constant during adjustment of the vertical position of said lens system.

7. Means for producing a gravitationally oriented vertical collimated beam of light comprising a closed chamber, a lens system situated in the bottom wall of said chamber and having its nodal point within said chamber, a spherical specularly polished ball at said nodal point, a light source, a transparent fluid filling said chamber to a level above said nodal point and forming a reflective surface, and means for projecting an image of said light source on said ball, the distance between said nodal point and the interface of said fluid being adjusted to equal half the focal length of said lens system.

8. Means for producing a gravitationally oriented vertical collimated beam of light comprising a cylindrical chamber, a lens system situated in the bottom closure of said chamber and having its nodal point within said chamber, a polished spherical ball, a slab of methacrylate resin for holding said ball at said nodal point, a light source oriented to produce a point image thereof in said ball, said point image being adjusted to coincide with said nodal point, the distance between said nodal point and the interface of said fluid being adjusted to equal half the focal length of said lens system and mineral oil filling said chamber to a level above said nodal point and forming a partially reflective surface to thereby produce a vertically oriented collimated beam of light.

References Cited in the file of this patent

UNITED STATES PATENTS

| | | |
|---|---|---|
| 1,085,612 | Jacob | Feb. 3, 1914 |
| 2,124,892 | Nichols | July 26, 1938 |
| 2,173,142 | Thurlow et al. | Sept. 19, 1939 |
| 2,451,409 | Petry et al. | Oct. 12, 1948 |
| 2,557,340 | Carbonara | June 19, 1951 |
| 2,577,807 | Pryor | Dec. 11, 1951 |
| 2,590,184 | Kaulomzine | Mar. 25, 1952 |
| 2,633,050 | Baker | Mar. 31, 1953 |

FOREIGN PATENTS

| | | |
|---|---|---|
| 403,141 | Germany | Sept. 25, 1924 |

OTHER REFERENCES

Johnson Text, Practical Optics, 1922, publ. Benn Brothers Ltd., 8 Bonverie Street, London; page 133. Copy in Division 7.